(12) United States Patent
Jeran et al.

(10) Patent No.: US 10,536,611 B2
(45) Date of Patent: Jan. 14, 2020

(54) PRINTER AUTHENTICATION

(71) Applicant: Hewlett-Packard Development Company, L.P., Houston, TX (US)

(72) Inventors: Paul Jeran, Boise, ID (US); Marvin D Nelson, Meridian, ID (US); Honee L Mesa, Eagle, ID (US); Chris R Gunning, Boise, ID (US); Erik D Ness, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/073,031

(22) PCT Filed: May 27, 2016

(86) PCT No.: PCT/US2016/034642
§ 371 (c)(1),
(2) Date: Jul. 26, 2018

(87) PCT Pub. No.: WO2017/204824
PCT Pub. Date: Nov. 30, 2017

(65) Prior Publication Data
US 2019/0037106 A1     Jan. 31, 2019

(51) Int. Cl.
*H04N 1/44*     (2006.01)
*G06F 21/44*    (2013.01)
(Continued)

(52) U.S. Cl.
CPC ........... *H04N 1/4426* (2013.01); *G06F 21/44* (2013.01); *G06F 21/608* (2013.01); *G06F 21/72* (2013.01);
(Continued)

(58) Field of Classification Search
CPC .................................................. H04N 1/4426
(Continued)

(56) References Cited

U.S. PATENT DOCUMENTS

| 7,774,619 B2 | 8/2010 | Paaske et al. |
| 2003/0083996 A1 | 3/2003 | Fischer |

(Continued)

FOREIGN PATENT DOCUMENTS

EP     2286328 B1     8/2014

OTHER PUBLICATIONS

IOActive, "IOActive Security Advisory", 2014, http://www.ioactive.com/pdfs/IOActive_Belkin-advisory-lite.pdf, 5 pages.

*Primary Examiner* — Jacky X Zheng
(74) *Attorney, Agent, or Firm* — HPI Inc. Patent Department (57) ABSTRACT

Examples associated with printer authentication are described. One example print container includes a space for a supply of print material and an interface for delivering the print material to a printer to which the print container is connected. An authentication module provides an authentication signal to a decrypted module embedded in firmware of the printer. The decrypted firmware module is kept in an encrypted state until decrypted by a decryption module embedded in the firmware of the printer. The decrypted module is decrypted after the decryption module receives a decryption key after release of the printer.

15 Claims, 6 Drawing Sheets

(51) Int. Cl.
*G06F 21/60* (2013.01)
*G06F 21/72* (2013.01)
*H04L 9/08* (2006.01)
*H04N 1/00* (2006.01)

(52) U.S. Cl.
CPC ......... *H04L 9/0819* (2013.01); *H04N 1/0097* (2013.01); *H04N 1/4433* (2013.01)

(58) Field of Classification Search
USPC ...................................................... 358/1.15
See application file for complete search history.

(56) References Cited

U.S. PATENT DOCUMENTS

| | | |
|---|---|---|
| 2006/0005046 A1 | 1/2006 | Hars |
| 2006/0087678 A1* | 4/2006 | Simpson ................. G06F 21/34 358/1.15 |
| 2008/0072327 A1 | 3/2008 | Thomlinson et al. |
| 2011/0169803 A1 | 3/2011 | Refsirup |
| 2011/0276807 A1 | 11/2011 | Shin |
| 2013/0083096 A1* | 4/2013 | Rice ........................ G06F 21/44 347/2 |
| 2013/0318357 A1 | 11/2013 | Abraham et al. |
| 2014/0169803 A1* | 6/2014 | Lee .................... G03G 15/0863 399/12 |
| 2014/0270813 A1* | 9/2014 | Ignatchenko ........ B41J 2/17546 399/12 |
| 2015/0191007 A1 | 7/2015 | Anderson et al. |

\* cited by examiner

PRINTER AUTHENTICATION

CROSS REFERENCE TO RELATED APPLICATIONS

The subject matter of this application is related to that of co-pending patent application Ser. No. PCT/US2016/034631 filed concurrently herewith by M. Nelson et al. for FIRMWARE MODULE ENCRYPTION and assigned to a common assignee. The disclosure of application Ser, No. PCT/US2016/034631 is incorporated herein by reference.

The subject matter of this application is related to that of co-pending patent application Ser. No. PCT/US2016/034637 filed concurrently herewith by M. Nelson et al. for PRINTER FIRMWARE ENCRYPTION and assigned to a common assignee. The disclosure of application Ser. No. PCT/US2016/034637 is incorporated herein by reference.

BACKGROUND

Printers of all shapes, sizes, and types consume print materials to create their desired output, whether that output is a printed page, a photograph, a poster, a box to hold a product, a 3D printed model, and so forth. The print materials are often delivered to the printers in containers that are inserted or otherwise connected to the printers so that the printer does not have to be replaced when it runs out of a print material. Some print containers contain electronic mechanisms that communicate with the printer for a variety of purposes including, for example, security, tracking remaining materials, the printing process itself, and so forth.

BRIEF DESCRIPTION OF THE DRAWINGS

The present application may be more fully appreciated in connection with the following detailed description taken in conjunction with the accompanying drawings.

DETAILED DESCRIPTION

Systems methods, and equivalents associated with printer authentication are described. When a manufacturer sells printers, the manufacturer often also sells aftermarket printing supplies as a secondary market to the printer. In some cases, the manufacturer may make more money selling the printing supplies than selling the printers themselves. The manufacturer may even sell printers at or below the cost of producing the printers, with the expectation of recouping losses on the aftermarket supplies. This business model may lead to competitors that operates solely in the supply industry to undercut the printer manufacturer on the printing supplies. The competitors may employ a variety of techniques including producing their own supplies, refilling supply containers originally supplied by the printer manufacturer, and so forth. Supplies produced by the competitors may be inferior to those provided by the manufacturer to allow the competitor to further undercut the manufacturer. Sometimes, the inferior supplies may be damaging to the original printer and/or reduce its effective life time, which may cause the manufacturer or consumers to incur unnecessary service and/or printer replacement costs. In other examples, competitors may illegally counterfeit supplies by, for example, infringing intellectual property rights owned by the manufacturer in the printer and/or the supplies. Competitors may also encourage cost cutting consumers of the printers to breach service contracts with the manufacturer, causing the consumer and/or the manufacturer to incur additional costs related to the contract.

To hinder usage of counterfeit or otherwise unauthorized aftermarket printer supplies, a printer manufacturer may embed a series of encrypted firmware modules within a printer that perform a variety of authentication techniques. The encrypted firmware modules may be periodically activated over time, corresponding to a release schedule for print supplies. Print supplies manufactured over the course of the release schedule may be designed to respond to authentication techniques that have been recently activated within the printer. This may make it more difficult for counterfeiters to keep up with authentication techniques used by printers and newly released cartridges. Additionally, the new authentication techniques may be activated without updating the firmware of the printer allowing the authentication techniques to be activated in the printer without access to the printer after the printer has been distributed.

Figure 1:
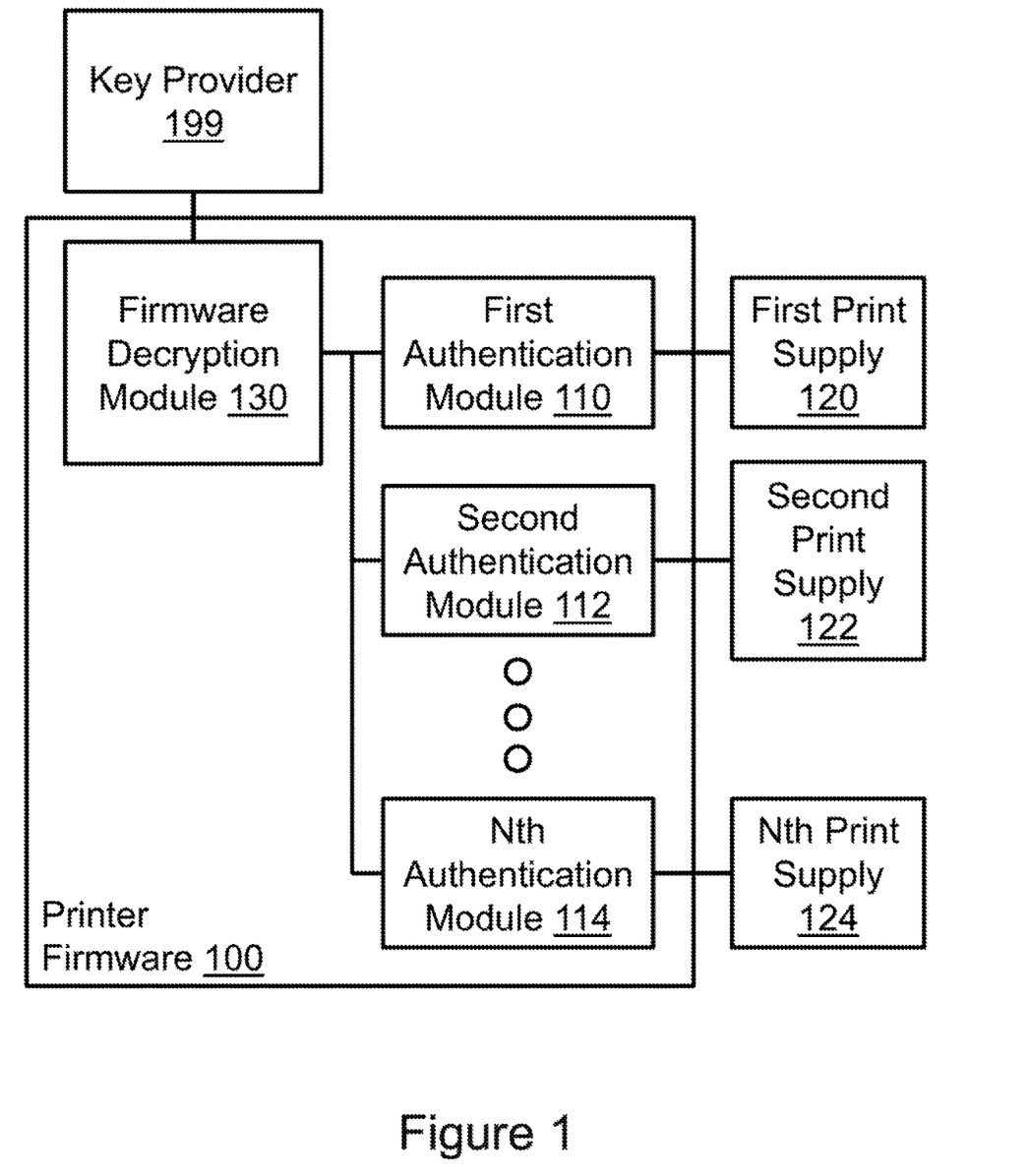
FIG. 1 illustrates an example printer firmware associated with printer authentication.

FIG. 1 illustrates an example printer firmware 100 associated with printer authentication. It should be appreciated that the items depicted in FIG. 1 are illustrative examples, and many different systems, devices, and so forth, may operate in accordance with various examples.

FIG. 1 illustrates an example printer firmware 100 associated with printer authentication. Printer firmware 100 may be embedded in a printer (not shown). The printer may perform a variety of functions, some of which may be controlled by other unillustrated portions of printer firmware 100. Printer firmware 110 includes a set of authentication modules including first authentication module 100, second authentication module 112, and Nth authentication module 114. Though three authentication modules are shown, printer firmware 100 may include any number of authentication modules based on, for example, firmware space available, or other technical or business concerns. The authentication modules may reside within printer firmware 100 in an encrypted state. The encrypted state may prevent activation of the authentication modules unless respective decryption keys are also available to the printer firmware.

For consistency in explanation, the authentication modules will be described herein based on their activation order. Consequently, for description purposes, first authentication module 110 may be activated at a first point in time, second authentication module 112 may be activated at a second point of time later than the first point in time, and so forth. However, a printer firmware 110 having N authentication modules may have the N authentication modules activated in a variety of orders depending on which order decryption keys for authentication modules are made available to printer firmware 100. By way of illustration, a set schedule may result in decryption keys being received in an order known prior to the eventual activation of the authentication modules. Encryption keys being released on a set schedule may occur when, for example, encryption keys are stored securely within a printer via a technology that is difficult to modify once the printer has been sold. In other examples, decryption keys may be provided in an order determined over time. Providing decryption keys over time may be possible when, for example, there is a high likelihood that the printer will have network access allowing decryption keys to be provided via the network. The technique used for decryption key delivery may depend on, for example, whether there is a set schedule for decryption key delivery, a likelihood a printer will have access to a network, and so forth.

When decrypted and activated, authentication modules may authenticate print supplies as print supplies that are authorized for use by the printer in which printer firmware 100 is embedded. Though print supplies 120, 122, and 124 are illustrated as single items, the print supplies may actually represent sets of print supplies. In other examples, components of printers other than print supplies may also be authenticated by decrypted authentication modules. For example, it may also be desirable to authenticate replacement parts, printer peripherals, and so forth.

Activating an authentication module may be performed using a variety of techniques. In one example, authentication modules may operate independently of one another and be capable of executing, perpetually once decrypted unless otherwise modified at a later point. In other examples, activation of an authentication module may prevent a previously active authentication module from running, effectively causing authentication modules to replace one another once decrypted. In another example, authentication modules may be run once and modify another portion of firmware, updating the firmware to authenticate a new print supply. Other activation techniques may also be possible.

In various examples, different authentication modules may authenticate different print supplies. By way of illustration, first authentication module 110 may authenticate a first print supply 120, second authentication module 112 may authentication second print supply 122, and Nth authentication module may authenticate an Nth print supply 124. In other examples, authentication modules may authenticate sets of print supplies based, for example, on their activation order. By way of illustration, second authentication module 112 may authenticate first print supply 120 and second print supply 122, and Nth authentication module 114 may authenticate first print supply 120, second print supply 122, Nth print supply 124, and any other print supplies. In other examples, authentication modules may be configured to authenticate known sets of print supplies, and so forth. In another alternative, different authentication modules may be configured to attempt to authenticate print supplies using unique techniques, and print supplies may be configured to respond to different sets of the unique techniques.

How authentication modules authenticate print supplies may depend on the sophistication of the print supplies. In some examples where print supplies merely deliver materials to a printer, authentication may be achieved by an authentication module causing a memory embedded in a print supply to be read for, for example, an authentication code. In other examples, print supplies may be engineered to be capable of communicating various information to a printer when connected and provided power. In these examples, the print supplies may generate a response to a signal received from an authentication module to prove the print supplies are authorized.

As discussed above, authentication modules may initially reside within printer firmware 100 in an encrypted state and be inactive while encrypted. To decrypt the authentication modules, printer firmware 100 may include a decryption module 130. Decryption module 130 may receive decryption keys that correspond to authentication modules from a key provider 199, thereby causing decryption module 130 to decrypt and activate the authentication modules. In various examples, key provider 199 may reside within another component of the printer in which printer firmware 100 is embedded. By way of illustration a secure application specific integrated circuit built into the printer may act as key provider 199 and provide decryption keys to firmware decryption module 130 based on certain known events. These events may be, for example, based on the passage of time. This may be desirable when a release schedule for batches of print supplies is known at a time of production of the printer so that authentication modules can be decrypted at times corresponding to release of the batches of print supplies. In other examples, key provider 199 may be external to the printer containing printer firmware 100. An external key provider 199 may be, for example, a remote server connected to the printer over a network, a user, another device to which the printer is connected, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to instructions stored on a computer-readable medium or in execution on a machine that perform a function(s) or an action(s), and/or to cause a function or action from another module, method, and/or system. Where multiple logical modules are described, it may be possible to incorporate the multiple logical modules into one logical module. Similarly, where a single logical module is described, it may be possible to distribute that single logical module between multiple logical modules.

Figure 2:
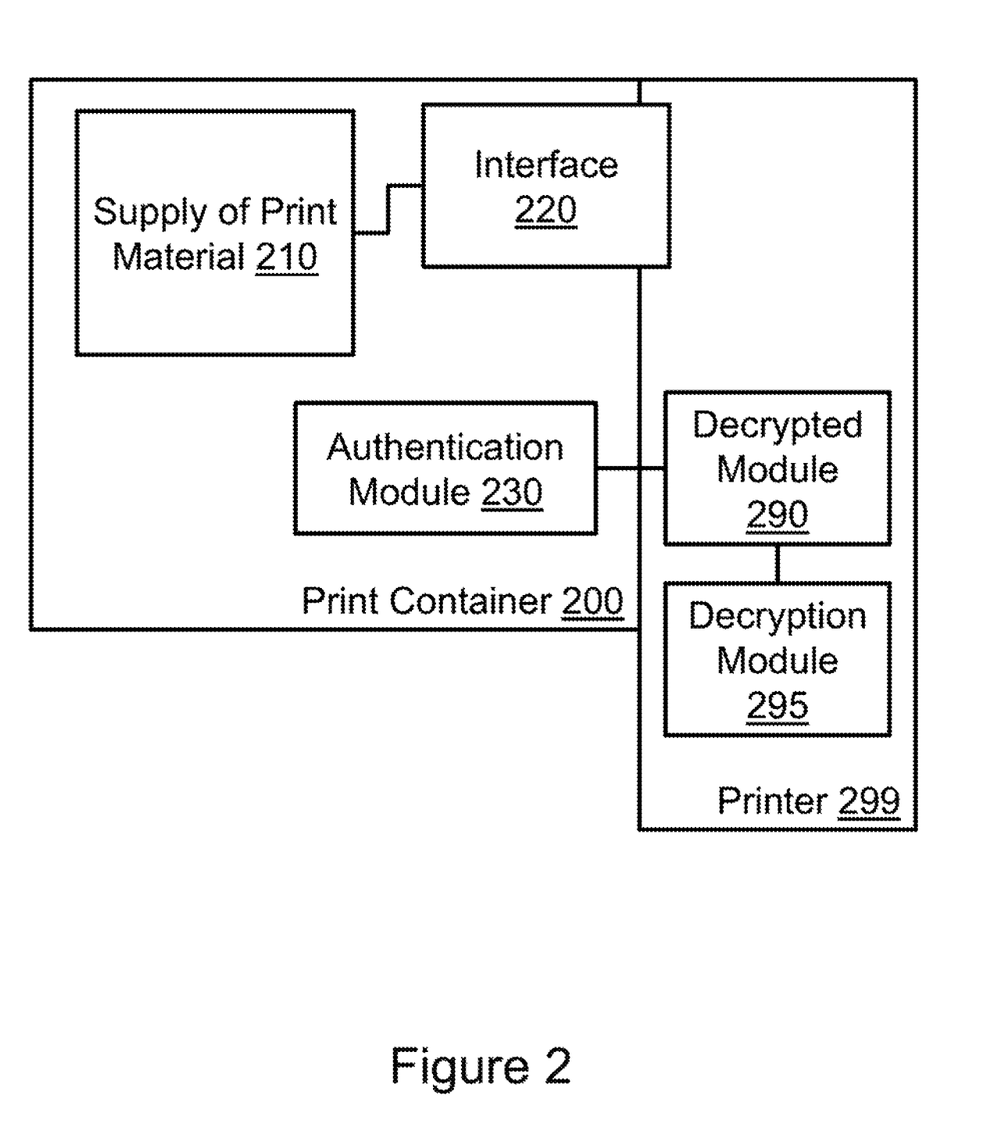
FIG. 2 illustrates an example print container associated with printer authentication.

FIG. 2 illustrates an example print container 200 associated with printer authentication. Print container 200 includes a supply of print material 210. Supply of print material 210 may be stored in a space, cavity, hallow, and s forth built into print container 200.

Print container 200 also includes an interface 220. Interface 220 may deliver print material from supply of print material 210 to a printer 299 to which print container 200 is connected. Thus, printer 299 may consume printer material itself as it completes print jobs. In other examples, printer 299 may control print container 200 to eject print material to complete jobs. Printer 299 may be, for example, a desktop printer, a shared office printer, an industrial printer, a 3D printer, and so forth. In various examples, print container 200 may be inserted into a receptacle of printer 299 that is designed to receive print containers 200. In other examples, interface 220 may connect print container 200 and printer 299 via a hose or other print material delivery mechanism.

Print container 200 also includes an authentication module 230. Authentication module 230 may provide an authentication signal to a decrypted module 290 embedded in a firmware of printer 299. In various examples, decrypted firmware module 290 may be kept in an encrypted state in the firmware of printer 299 until the firmware is decrypted by a decryption module 295. A decryption module 295 may also be embedded in the firmware of printer 299. Decryption module 295 may decrypt decrypted module 290 upon receiving a decryption key that corresponds to decryption module 290. The decryption key may be received by decryption module 295 after release of the printer.

In some examples, authentication module 230 may respond with the authentication signal to a request received from printer 299 (e.g., from decrypted module 290). In other examples, authentication module 230 may be a memory embedded in print container 200. Consequently, decrypted module 290 may access the memory when print container 200 is connected to printer 299. This may be achieved by, for example, building the memory into print container 200 such that an operable connection exists between the memory and decrypted module 290 via interface 220.

Figure 3:
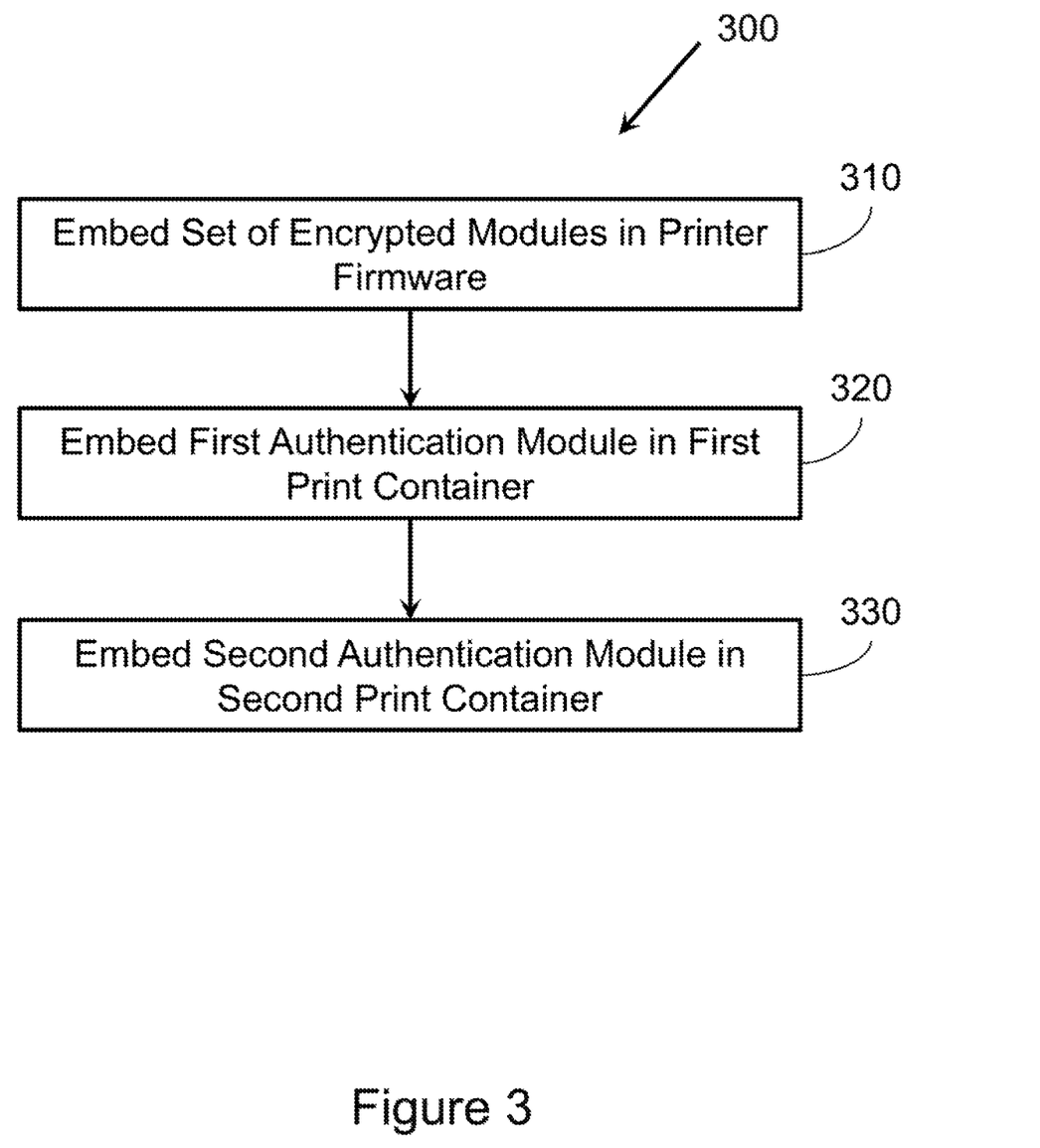
FIG. 3 illustrates a flowchart of example operations associated with printer authentication.

FIG. 3 illustrates a method 300 associated with printer authentication. Method 300 may be embodied on a non-transitory processor-readable medium storing processor-executable instructions. The instructions, when executed by a processor, may cause the processor to perform method 300.

Method 300 includes embedding a set of encrypted modules in a firmware of a printer at 310. The set of encrypted modules may be decrypted and activated upon receiving members of a set of decryption keys. The decryption keys may correspond to specific members of the set of encrypted modules. The encrypted modules may facilitate delivering additional functionality to and/or modifying authentication techniques used by the printer after the printer has been distributed, without having access the printer (e.g., physical access, network access).

Method 300 also includes embedding a first authentication module in a first print container at 320. The first authentication module may provide a fir authentication signal to the printer into which encrypted modules were embedded at action 310. The first authentication signal may control a first encrypted module to accept the first print container as an approved print container. An approved container of print material may be, for example, a print container that has been designed and manufactured for the printer and is not a counterfeit print container.

Method 300 also includes embedding a second authentication module in a second print container at 330. The second authentication module may provide a second authentication signal to the printer. The second authentication signal may control a second encrypted module to accept the second print container as an approved print container. Additionally, the second authentication signal may not control the first encrypted module to accept the second print container as an approved print container.

In some examples, the first authentication module and the second authentication module may be memories embedded in print containers that are accessed by the printer to obtain the respective authentication signals. In other examples, the first authentication module and the second authentication module may respond to requests received from encrypted modules with the respective, authentication signals.

Figure 4:
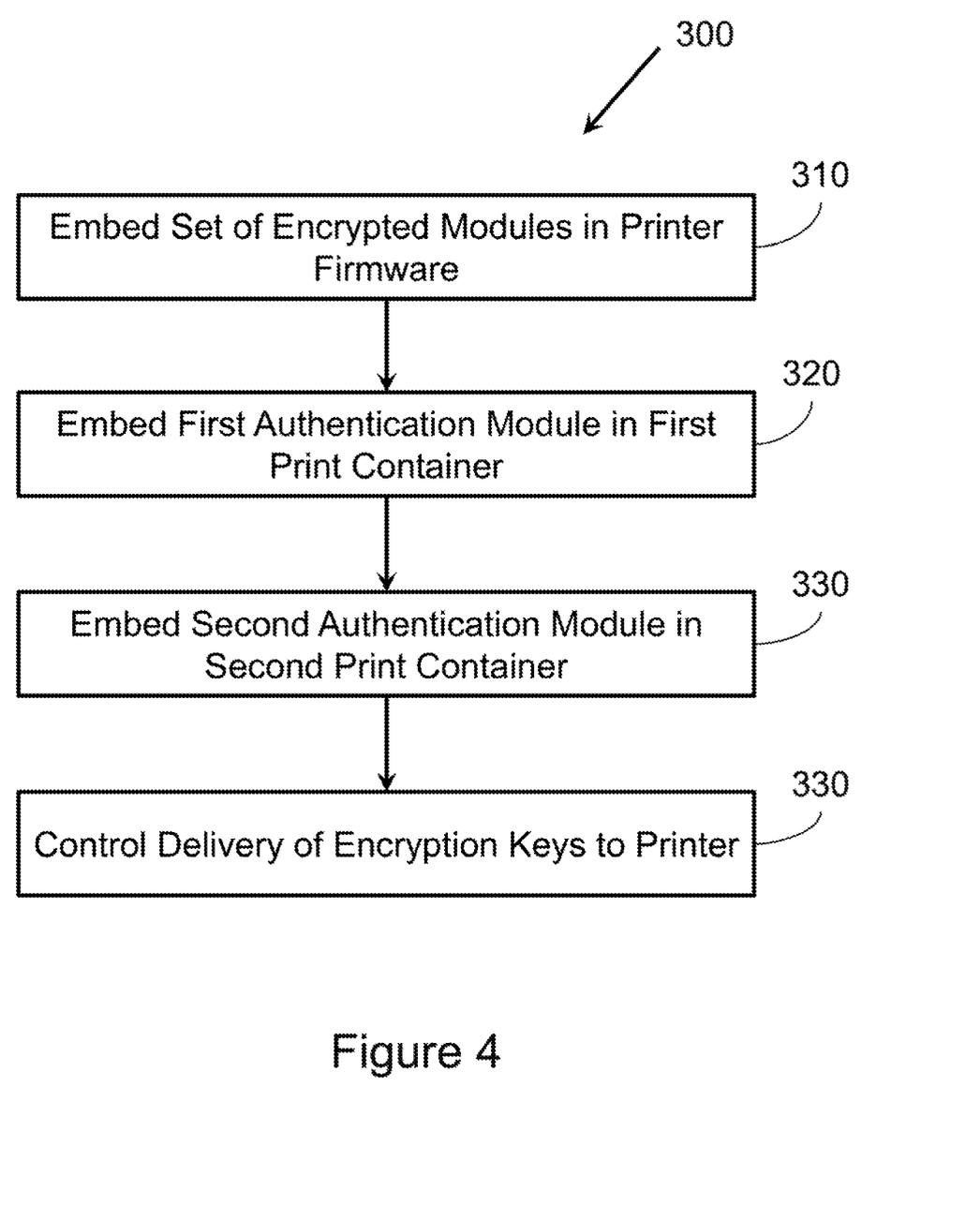
FIG. 4 illustrates another flowchart of example operations associated with printer authentication.

FIG. 4 illustrates a method 400 associated with printer authentication. Method 400 includes several actions similar to those described above with reference to method 300 (FIG. 3). For example, method 400 includes embedding a set of encrypted modules in a printer firmware at 410, embedding a first authentication module in a first print container at 420, and embedding a second authentication module in a second print container at 430.

Method 400 also includes controlling delivery of members of the set of decryption keys to the printer at 440. Controlling delivery of the members of the set of decryption keys to the printer may include embedding a secure application specific integrated circuit (ASIC) into the printer. In other examples, delivery of the members of the set of decryption keys may be achieved by providing the decryption keys to the printer via a network connection, providing the decryption keys to a user with access to the printer, and so forth. The secure ASIC may supply members of the set of decryption keys upon occurrences of predefined events. The predefined events may relate to, for example, specific dates and times, usage of the printer, maintenance events associated with the printer, and so forth.

Figure 5:
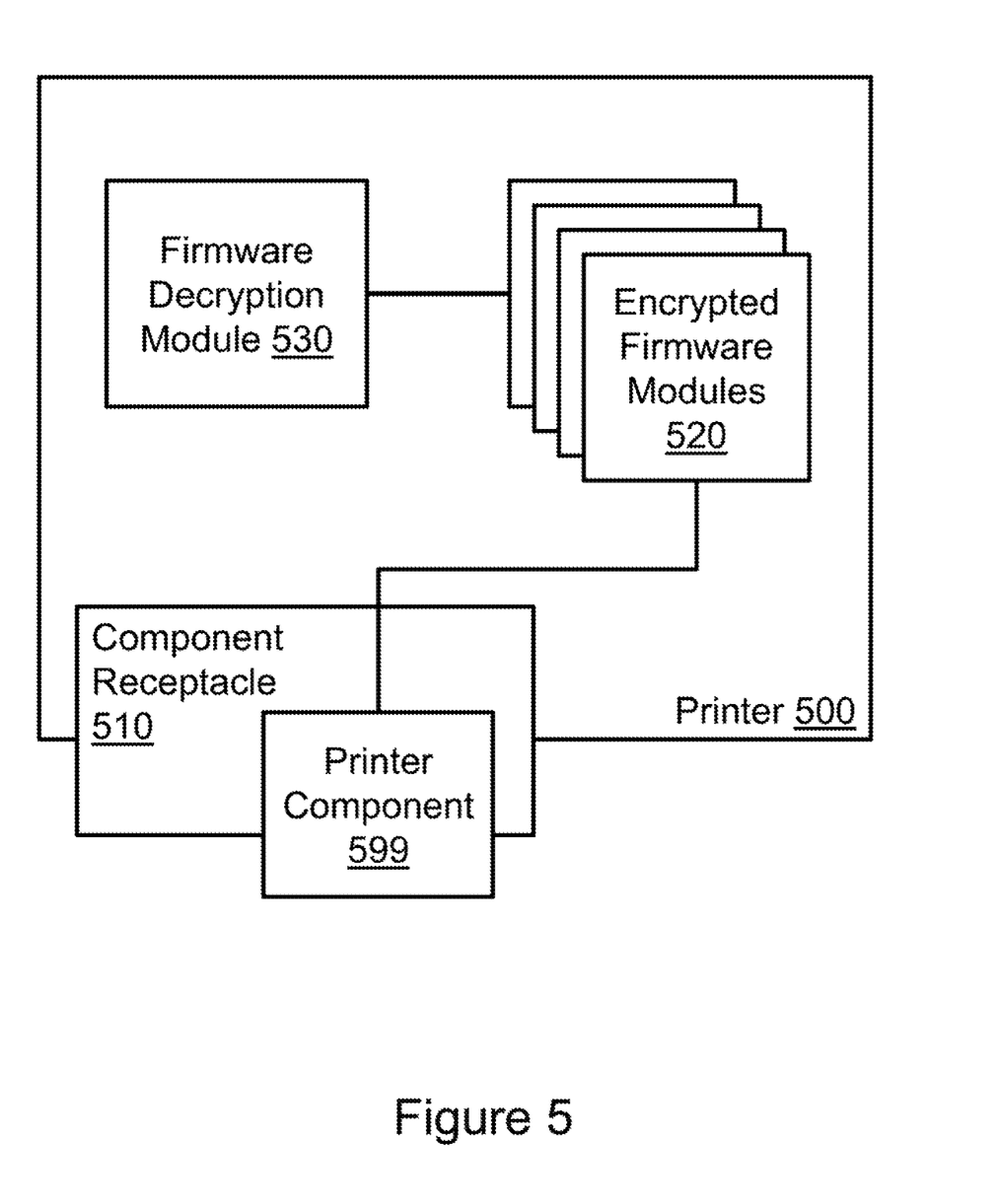
FIG. 5 illustrates an example printer associated with printer authentication.

FIG. 5 illustrates a printer 500 associated with printer authentication. Printer 500 includes a component receptacle 510. Component receptacle 510 may receive a printer component 599. The component may be, for example, a container that delivers a supply of print material to the printer, a replacement part for the printer, and so forth.

Printer 500 also includes a set of encrypted firmware modules 520. Encrypted firmware modules 520 may authenticate printer components 599 inserted into component receptacle 510. Encrypted firmware modules 520 may employ a set of authentication techniques to authenticate printer components 599. In some examples, a first authentication technique may authenticate a first set of printer components and a second authentication technique may authenticate a second set of printer, components. Here, the first set of printer components may be a subset of the second set of printer components.

Printer 500 also includes a firmware decryption module 530. Firmware decryption module 530 may periodically decrypt a member of the set of encrypted firmware modules 520. Firmware decryption module 530 may decrypt the member of the set of encrypted firmware modules 520 upon receiving a decryption key that corresponds to the member of the set of encrypted firmware modules 520.

In some examples, printer 500 may include a secure storage module (not shown). The secure storage module may periodically release decryption keys to firmware decryption module 530. The decryption keys may be released based on a schedule of events generated prior to the production of the printer. The events may be based on, printer usage, usage of components of the printer, passage of time, and so forth.

Figure 6:
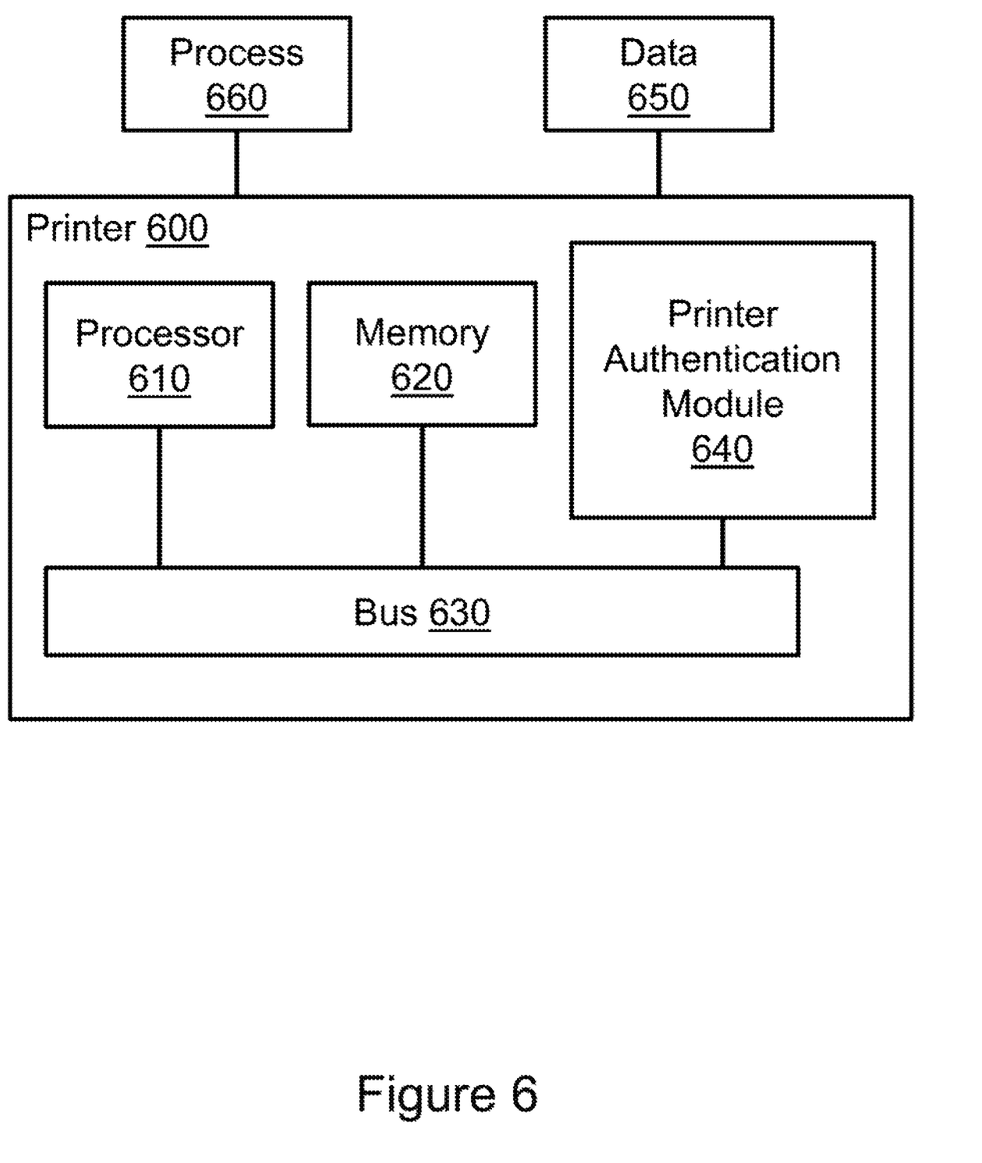
FIG. 6 illustrates an example printer in which example systems, and methods, and equivalents, may operate.

FIG. 6 illustrates an example printer in which example systems and methods, and equivalents, may operate. The example printer may be a printer 600 that includes a processor 610 and a memory 620 connected by a bus 630. Printer 600 includes a printer authentication module 640. Printer authentication module 640 may perform, alone or in combination, various functions described above with reference to the example devices, methods, and so forth. In different examples, printer authentication module 640 may be implemented as a non-transitory computer-readable medium storing processor-executable instructions.

The instructions may also be presented to device 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Device 600 may also be associated with other devices including other computers, devices, peripherals, and so forth in numerous configurations (not shown). It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A print container, comprising:
   a space for a supply of print material controllably deliverable to a printer to which the print container is communicatively connected; and
   a first non-transitory computer readable storage medium having sets of processor-executable instructions stored thereon and executable by a processor in the printer, the instructions comprising:
   an authentication instruction set executable by the processor to provide an authentication signal to a decrypted firmware instruction set of processor-executable instructions stored on a second non-transitory computer readable storage medium embedded in the printer and executable by the processor;
   where the decrypted firmware instruction set is kept in an encrypted state until decrypted, upon receipt of a decryption key, by a decryption instruction set of processor-executable instructions stored on the second medium and executable by the processor, where the decryption key is received by the decryption instruction set after release of the printer.

2. The print container of claim 1, where the authentication instruction set is accessed by the decrypted firmware instruction set when the print container is connected to the printer.

3. A method, comprising:
   embedding in the firmware of a printer, a set of encrypted executable firmware modules that are decrypted and activated upon receiving members of a set of decryption keys that correspond to members of the set of encrypted modules;
   embedding, in a first print container communicatively coupleable to the printer, a first authentication module that provides a first authentication signal to the printer, where the first authentication signal controls a first encrypted executable firmware module to, when decrypted and activated, accept the first print container as an approved print container; and
   embedding in a second print container communicatively coupleable to the printer, a second authentication module that provides a second authentication signal to the printer, where the second authentication signal controls a second encrypted executable firmware module to, when decrypted and activated, accept the second print container as an approved print container, and where the second authentication signal does not control the first encrypted module to accept the second print container as an approved print container.

4. The method of claim 3, comprising controlling delivery of the members of the set of decryption keys to the printer.

5. The method of claim 4, where controlling delivery of the members of the set of decryption keys to the printer comprises embedding a secure application specific integrated circuit into the printer that supplies the members of the set of decryption keys upon occurrences of predefined events.

6. The method of claim 3, where the first authentication module and the second authentication module are memories that are accessed by the printer to obtain respective authentication signals.

7. The method of claim 3, where the first authentication module and the second authentication module respond with respective authentication signals to requests received from encrypted modules.

8. The method of claim 3, wherein the first encrypted module employs a first authentication technique to accept the first print container but not a second print container as an approved print container, and wherein the second encrypted module employs a second authentication technique to accept the first and the second print containers as approved print containers.

9. A printer, comprising:
   a processor; and
   a non-transitory computer readable storage medium, coupled to the processor, having sets of processor-executable instructions stored thereon and executable by the processor, the instructions comprising:
   a plural encrypted firmware instruction sets executable by the processor when decrypted to authenticate, using a set of authentication techniques, replaceable components installed in the printer; and
   a firmware decryption instruction set to periodically decrypt a member of the encrypted firmware instruction sets upon receiving a decryption key that corresponds to the member.

10. The printer of claim 9, where a first authentication technique authenticates a first set of printer components, where a second authentication technique authenticates a second set of printer components, and where the first set of printer components is a subset of the second set of printer components.

11. The printer of claim 9, wherein the encrypted firmware instruction sets comprise a secure storage instruction set to periodically release decryption keys to the firmware decryption instruction set.

12. The printer of claim 11, where the decryption keys are released based on a schedule of events generated prior to the production of the printer.

13. The printer of claim 12, where the events are based on one of printer usage, usage of components of the printer, and passage of time.

14. The printer of claim 9, where the replaceable components comprise a container that delivers a supply of print material to the printer.

15. The printer of claim 9, where the printer component is a replacement part for the printer.

* * * * *